(12) United States Patent
Li et al.

(10) Patent No.: US 12,536,725 B2
(45) Date of Patent: Jan. 27, 2026

(54) SYSTEMS AND METHODS FOR SUBJECT-DRIVEN IMAGE GENERATION

(71) Applicant: Salesforce, Inc., San Francisco, CA (US)

(72) Inventors: Junnan Li, Singapore (SG); Chu Hong Hoi, Singapore (SG); Dongxu Li, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 132 days.

(21) Appl. No.: 18/498,768

(22) Filed: Oct. 31, 2023

(65) Prior Publication Data

US 2024/0161369 A1  May 16, 2024

Related U.S. Application Data

(60) Provisional application No. 63/500,767, filed on May 8, 2023, provisional application No. 63/424,413, filed on Nov. 10, 2022.

(51) Int. Cl.
*G06T 11/60* (2006.01)
*G06T 9/00* (2006.01)
*G06V 10/74* (2022.01)
*G06V 10/82* (2022.01)

(52) U.S. Cl.
CPC ............. *G06T 11/60* (2013.01); *G06T 9/00* (2013.01); *G06V 10/761* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 12,198,048 B2 | 1/2025 | Singh et al. | |
| 2023/0281400 A1* | 9/2023 | Wang | G06F 40/284 704/2 |
| 2023/0368510 A1* | 11/2023 | Chen | G06V 20/70 |
| 2024/0087265 A1* | 3/2024 | Park | G06F 40/289 |
| 2024/0282094 A1* | 8/2024 | Tsimpoukelli | G06V 10/80 |

OTHER PUBLICATIONS

International Search Report and Written Opinion for PCT/US2024/027830, dated Jul. 17, 2024, 14 pages.

(Continued)

*Primary Examiner* — Edward Martello
(74) *Attorney, Agent, or Firm* — Haynes and Boone, LLP

(57) ABSTRACT

Embodiments described herein provide systems and methods of subject-driven image generation. In at least one embodiment, a system receives, via a data interface, an image containing a subject, a text description of the subject in the image, and a text prompt relating to a different rendition of the subject. The system encodes, via an image encoder, the image into an image feature vector. The system encodes, via a text encoder, the text description int a text feature vector. The system generates, by a multimodal encoder, a vector representation of the subject based on the image feature vector and the text feature vector. The system generates, by a neural network based image generation model, an output image based on an input combining the text prompt and the vector representation.

20 Claims, 12 Drawing Sheets

(56) References Cited

OTHER PUBLICATIONS

Chen et al., "Subject-driven Text-to-Image Generation via Apprenticeship Learning", arxiv (Cornell University), Apr. 14, 2023, pp. 1-18, XP093186354, DOI: 10.48550/arxiv.2304.00186 Retrieved from the Internet: URL:https://arxiv.org/pdf/2304.00186v2 [retrieved on Jul. 16, 2024], 18 pages.

Jia et al., "Taming Encoder for Zero Fine-tuning Image Customization with Text-to-Image Diffusion Models", Arxiv.org, Cornell University Library, 201 Olin Library Cornell University Ithaca, NY 14853, Apr. 5, 2023, XP091477959, 10 pages.

Li et al., "BLIP-Diffusion: Pre-trained Subject Representation for Controllable Text-to-Image Generation and Editing", arxiv.org, May 24, 2023, XP093180794, DOI: 10.48550/arxiv.2305.14720 Retrieved from the Internet: URL:https://arxiv.org/pdf/2305.14720v1 [retrieved on Jul. 16, 2024],22 pages.

Ruiz et al., "DreamBooth: Fine Tuning Text-to-Image Diffusion Models for Subject-Driven Generation", arxiv (Cornell University), Mar. 15, 2023, XP093179964, DOI: 10.48550/arxiv.2208.12242 Retrieved from the Internet: URL: https://arxiv.org/pdf/2208.12242v2 [retrieved on Jul. 16, 2024], 25 pages.

Deyao Zhu et al: "MiniGPT-4: Enhancing Vision-Language Understanding with Advanced Large Language Models", Arxiv.org, Cornell University Library, 201 Olin Library Cornell University Ithaca, NY 14853, Apr. 20, 2023 (Apr. 20, 2023), XP091490134.

Jean-Baptiste Alayrac et al: "Flamingo: a Visual Language Model for Few-Shot Learning", A Arxiv.org, Cornell University Library, 201 Olin Library Cornell University Ithaca, NY 14853, Apr. 29, 2022 (Apr. 29, 2022), XP091210828.

Junnan Li et al: "BLIP-2: Bootstrapping Language-Image Pre-training with Frozen Image Encoders and Large Language Models", Arxiv.org, Cornell University Library, 201 Olin Library Cornell University Ithaca, NY 14853, May 1, 2023, XP091498386.

International Search Report and Written Opinion mailed Jul. 19, 2024, International Patent Application No. PCT/US2024/027695, 110 pages.

Alayrac et al., "Flamingo: a Visual Language Model for Few-Shot Learning", DeepMind, Apr. 28, 2022., arXiv: 2204.14198v1, pp. 1-66.

\* cited by examiner

| Methods | DINO | CLIP-I | CLIP-T |
|---|---|---|---|
| Real Images (Oracle) | 0.774 | 0.885 | - |
| Textual Inversion | 0.569 | 0.780 | 0.255 |
| Re-Imagen | 0.600 | 0.740 | 0.270 |
| DreamBooth | 0.668 | 0.803 | 0.305 |
| – 100 fine-tuning steps | 0.396 | 0.698 | 0.322 |
| – 300 fine-tuning steps | 0.500 | 0.733 | 0.319 |
| Ours (ZS) | 0.594 (±0.004) | 0.779 (±0.003) | 0.300 (±0.002) |
| Ours (FT, avg. < 80 steps) | 0.670 (±0.004) | 0.805 (±0.002) | 0.302 (±0.001) |

FIG. 8

| Ablation Setups | DINO | CLIP-I | CLIP-T |
|---|---|---|---|
| BLIP-Diffusion (250K steps) | 0.566 | 0.773 | 0.299 |
| — w/o multimodal pre-training | 0.521↓ | 0.743↓ | 0.290↓ |
| — w/o training text encoder | 0.568↑ | 0.782↑ | 0.288↓ |
| — w/o subject text | 0.565↓ | 0.772↓ | 0.298↓ |
| — w/o subject dropping | 0.559↓ | 0.766↓ | 0.291↓ |

FIG. 10

SYSTEMS AND METHODS FOR SUBJECT-DRIVEN IMAGE GENERATION

CROSS REFERENCES

The instant application is related to co-pending and commonly-owned U.S. nonprovisional application Ser. No. 18/160,664, filed Jan. 27, 2023, which is hereby expressly incorporated herein by reference in its entirety.

The instant application is a nonprovisional of and claims priority under 35 U.S.C. 119 to U.S. provisional application No. 63/500,767, filed May 8, 2023, which is hereby expressly incorporated by reference herein in its entirety.

The instant application is a nonprovisional of and claims priority under 35 U.S.C. 119 to U.S. provisional application No. 63/424,413, filed Nov. 10, 2022, which is hereby expressly incorporated by reference herein in its entirety.

TECHNICAL FIELD

The embodiments relate generally to machine learning systems for image generation, and more specifically to systems and methods for subject-driven image generation.

BACKGROUND

Machine learning systems have been widely used in image generation tasks. For example, text-to-image generation models generate an output image based on an input text prompt, e.g., "a vase in a snow forest," and/or the like. Existing models may generate images of a particular subject, (e.g., "a vase") in different contexts or different variations. Existing generation models, however, require reiterating a large number (e.g., hundreds or thousands) of tedious fine-tuning steps for each new subject, which hinders these approaches from efficiently extending to a wide range of subjects. Therefore, there is a need for systems and methods for subject-driven image generation.

BRIEF DESCRIPTION OF THE DRAWINGS

FIGS. 8-11 provide charts illustrating exemplary performance of different embodiments described herein.

Figure 1:
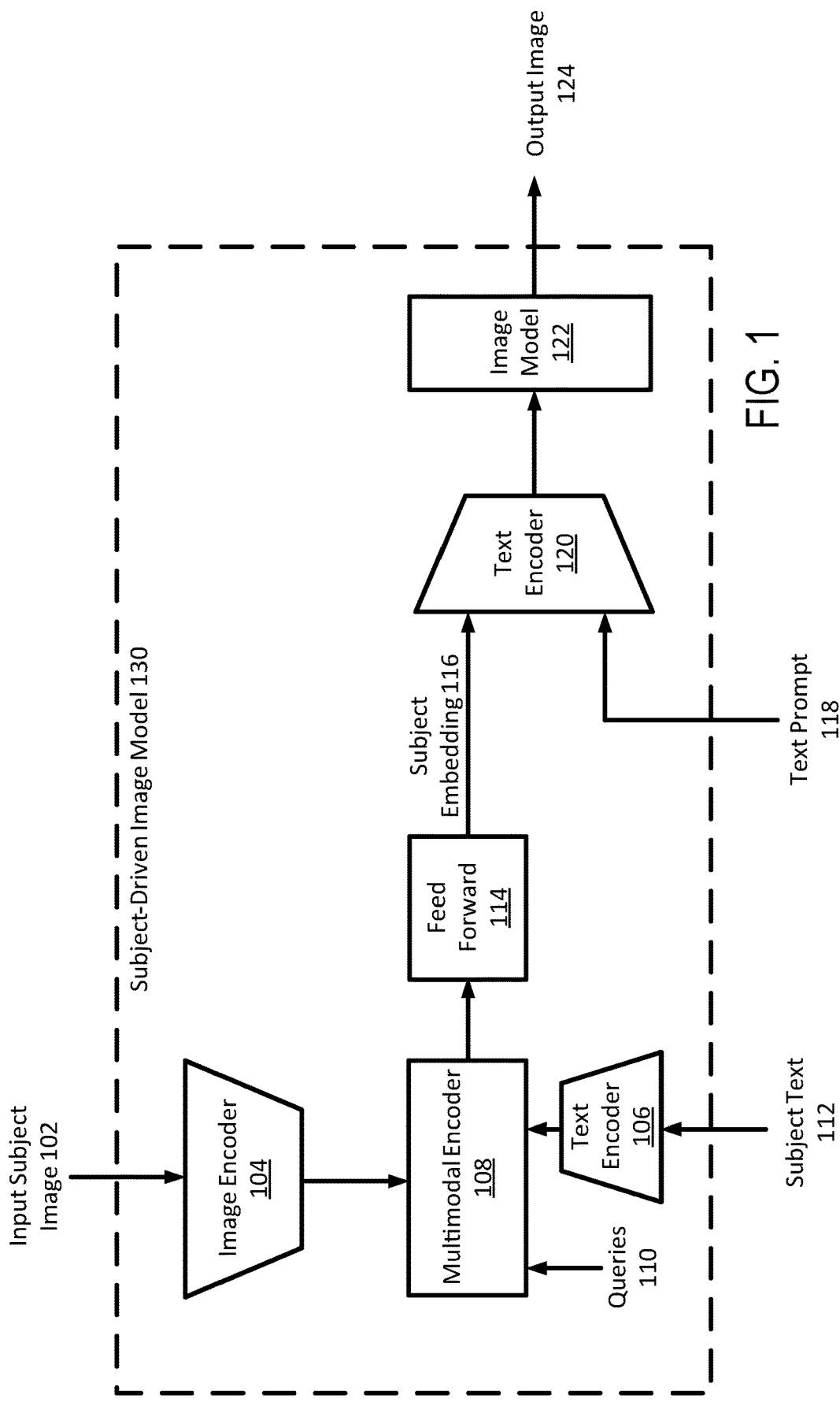
FIG. 1 is a simplified diagram illustrating a subject-driven image model framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Overview

Machine learning systems have been widely used in image generation tasks. For example, text-to-image generation models generate an output image based on an input text prompt, e.g., "a vase in a snow forest," and/or the like. Existing models may generate images of a particular subject, (e.g., "a vase") in different contexts or different variations. Existing generation models, however, require reiterating a large number (e.g., hundreds or thousands) of tedious fine-tuning steps for each new subject, which hinders these approaches from efficiently extending to a wide range of subjects.

In view of the need for systems and methods for subject-driven image generation, embodiments described herein provide a subject-driven image generation model that generates accurate images portraying renditions of a given subject using one or more subject images. The subject-driven image generation model may be built on a generic base image generation model, such as a denoising diffusion model, which generates an image based on an input prompt. Information about the subject may be provided to the base image generation model by generating an input prompt which includes a subject representation based on one or more input subject images.

Training of the subject-driven image generation model may be performed in multiple stages. In a first pre-training stage, a multimodal encoder may be trained to generate a latent representation of an input image and associated text input. Specifically, this may be done as the vision-language (multimodal) representation learning of the multimodal encoder (i.e., Q-Former) described in U.S. patent application Ser. No. 18/160,664, incorporated herein by reference. In this pre-training stage, vision-language representation learning enforces the multimodal encoder to learn visual representation that is most relevant to the input text.

In a second pre-training stage, subject representation learning, the multimodal encoder is trained for subject representation. The aim of this stage is for the model to learn to represent a subject from an input image, without representing other details of the input image unrelated to the subject (e.g., the background). To accomplish this, training input/output pairs of images may be used which include a subject in different contexts. The subject-driven image generation model may be provided an input image including a subject, and a prompt to generate an output image. The output image may be compared to the ground-truth subject image in a different context to generate a loss which is used for updating parameters of the model via backpropagation. In some embodiments, input/output pairs of images may be created by doing a background replacement on existing images. The subject representation learning stage is not specific to a certain subject, and is performed using images of a variety of subjects.

After the second pre-training stage (subject representation learning stage), zero-shot image generation may be performed using one or more subject images without any additional fine-tuning of the subject-driven image generation model. However, better performance may be achieved in some circumstances with an additional subject-specific fine-tuning stage.

The fine-tuning stage may be performed similar to the subject representation learning stage, but for a specific subject. For example, a user may provide one or more images of a subject (e.g., a dog). Parameters of the subject-driven image generation model may be updated based on a loss objective comparing images generated based on the input images to ground-truth images. The ground-truth images for the fine-tuning stage may be the same as the input images. In other words, the subject-driven image generation model may be trained to replicate the input image. In some embodiments, a background-replaced version of the input image is used as the ground-truth output. Certain parameters of the subject-driven image generation model may be frozen in order to prevent over-fitting.

At inference, given a subject image and a text description of the subject, the multimodal encoder generates a multimodal subject representation. The subject representation is combined with a text prompt and provided to a generic image generation model which generates an image of the subject based on the text prompt.

Embodiments described herein provide a number of benefits. For example, a variety of existing image generation models may be used with the methods described herein, as the input prompt for the various models may easily be replaced with a prompt that includes the subject representation without modifying parameters of the base image generation model itself. This may reduce the amount of training/fine-tuning required to create a final image generation model. By isolating a subject representation, multiple output images may be generated based on a single subject which are not tied to other aspect of a conditioning image. Compared with other methods, high quality zero-shot subject-driven image generation is possible, therefore requiring fewer computation and/or memory resources to generate a final image. Fine-tuning methods described herein are also more efficient than other methods as they require fewer fine-tuning steps than other methods. Therefore, neural network technology in image generation is improved.

FIG. 1 is a simplified diagram illustrating a subject-driven image model framework according to some embodiments. Subject-driven image model 130 comprises a base image model 122 and a multimodal encoder 108 which aids in the generation of an input prompt with subject representation for image model 122. Image model 122 may be, for example, a denoising diffusion model as discussed in FIG. 6. Other image models may be used for image model 122 if they generate images based on an input prompt. Subject-driven image model 130 takes an input subject image 102, a subject text 112, and a text prompt 118, and based on those inputs generates an output image 124. For example, an input subject image may be an image of a backpack on a chain-link fence, the subject text may be "backpack", and the text prompt may be "at the grand canyon". With these exemplary inputs, subject-driven image model 130 would generate an image of the backpack in the input image, but at the grand canyon.

Input subject image 102 may be encoded by an image encoder 104 into an image feature vector. Image encoder 104 may be a pretrained image encoder which extracts generic image features. Subject text 112 may be encoded by text encoder 106 into a text feature vector. The image feature vector and text feature vector may be input to multimodal encoder 108. Multimodal encoder 108 may be a query transformer ("Q-Former") as described in U.S. patent application Ser. No. 18/160,664, incorporated herein by reference. Multimodal encoder 108 may also take queries 110 as an input. Queries 110 may be randomly initialized vectors which may be tuned as part of the training process. Multimodal encoder 108 generates a vector representation of the subject (e.g., subject embedding) by using the subject text 112 to attend to the most relevant portions (i.e., the subject) of input subject image 102. In some embodiments, a feed forward neural network further updates the vector representation of the subject, providing subject embedding 116.

Subject embedding 116 and text prompt 118 maybe combined, and input to text encoder 120 to generate the prompt for image model 122. Image model 122 may then generate an output image 124 based on the prompt. Subject text 112 may also be combined with subject embedding 116 and text prompt 118. In some embodiments, subject embedding 116, text prompt 118, and subject text 112 may be combined by the use of a prompt template. The prompt template may be, for example, "[text prompt], the [subject text] is [subject embedding]". For example, if the text prompt is "a backpack at the grand canyon" and the subject text is "backpack", then the combined prompt would be "a backpack at the grand canyon, the backpack is" concatenated with the subject embedding 116.

In some embodiments, multiple input subject images 102 may be used in the generation of a single output image 124. Multimodal encoder 108 may encoder each subject image 102 with the subject text 112 to generate respective subject embeddings. Each of the subject embeddings may be combined (e.g., by an average) to generate a combined subject embedding 116. By using multiple images of the same subject as input subject images 102, the resulting averaged subject embedding may more fully isolate the subject from the images, removing more non-subject information from the subject embedding 116.

Training of the subject-driven image model 130 may be performed in multiple stages. In a first pre-training stage, multimodal encoder 108 may be trained to generate a latent representation of an input image and associated text input. Specifically, this may be done as the vision-language (multimodal) representation learning of the multimodal encoder (i.e., Q-Former) described in U.S. patent application Ser. No. 18/160,664, incorporated herein by reference. In this pre-training stage, vision-language representation learning enforces the multimodal encoder to learn visual representation that is most relevant to the input text. A second pre-training stages is described with respect to FIG. 2

Figure 2:
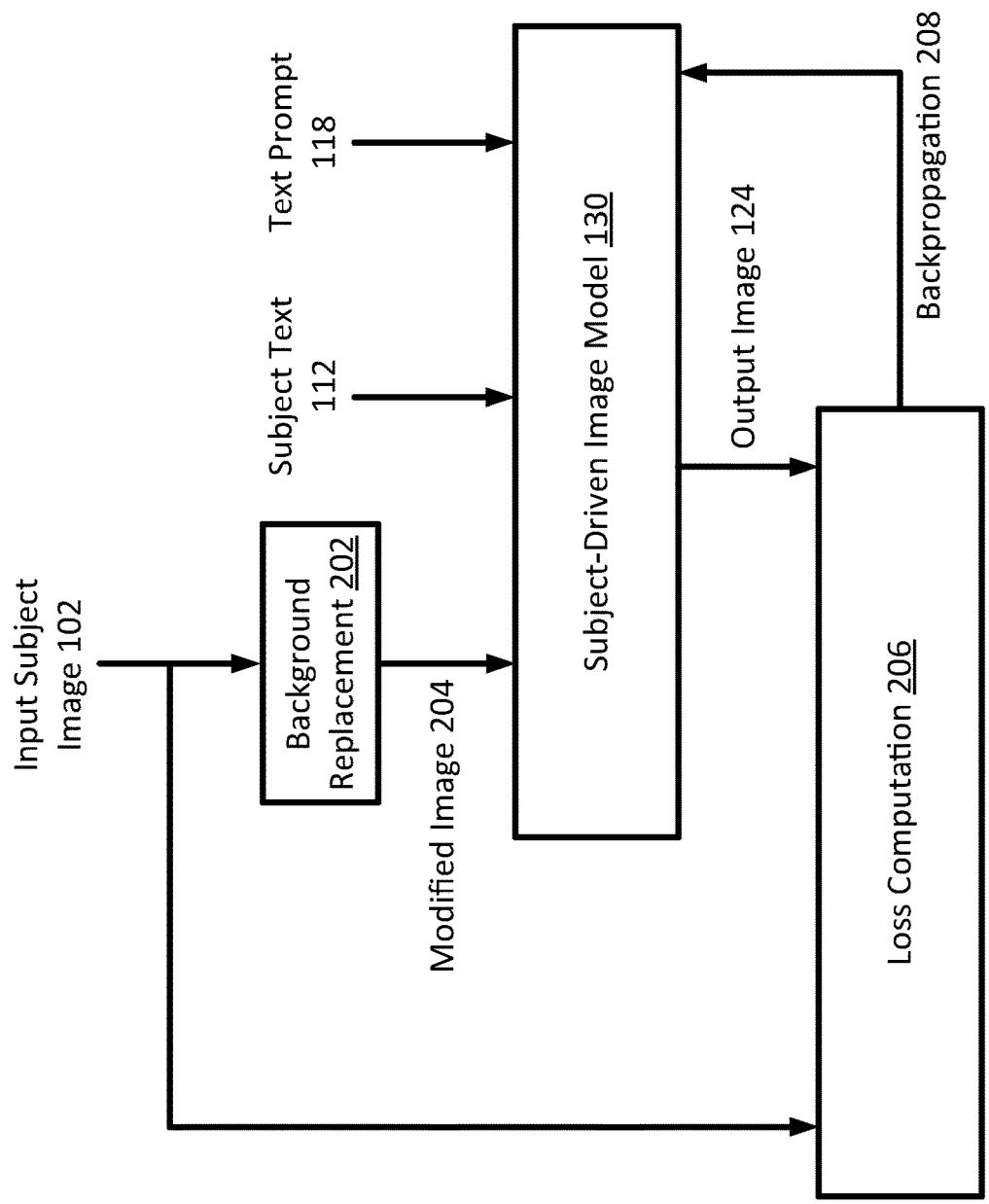
FIG. 2 is a simplified diagram illustrating a training framework for a subject-driven image model according to some embodiments.

FIG. 2 is a simplified diagram illustrating a training framework for a subject-driven image model according to some embodiments. Specifically, FIG. 2 illustrates a second pre-training stage which may occur after a first pre-training stages described in FIG. 1. In the second pre-training stage, subject representation learning, multimodal encoder 108 is trained for subject representation. Feed forward 114, queries 110, text encoder 120, and/or image model 122 may be jointly trained with multimodal encoder 108. The aim of this stage is for the model to learn to represent a subject from an input subject image 102, without representing other details of input subject image 102 unrelated to the subject (e.g., the background). To accomplish this, training ground-truth input/output pairs of images may be used which include a subject in different contexts.

To reduce the effort required in collecting multiple images of each subject in different contexts, input subject images 102 may be automatically modified by background replacement module 202 which replaces the background. The original input subject image 102 may be used as the ground truth image which subject-driven image model 130 is attempting to replicate. By using the modified image 204 as the input image to subject-driven image model 130, and the original input subject image 102 as the ground-truth comparison for loss computation 206, this allows the original caption of the source image to be used as text prompt 118, and the input subject image 102 may have any random background without requiring an accurate text description of the background.

In some embodiments, background replacement module 202 receives an input subject image 102 and a subject text 112 associated with input subject image 102. Input subject image 102 and subject text 112 may be input to a text-prompted segmentation model. A trimap may be generated by the segmentation model which maps portions of the input subject image 102 to foreground, background, and a low confidence region. Given the trimap, background replacement module 202 may extract the foreground (i.e., subject) and place it onto a random background image via alpha blending.

The subject-driven image generation model may be provided an input subject image 102 including a subject, ad subject text 112, and a text prompt 118 to generate an output image 124. The output image may be compared to the ground-truth subject image (e.g., modified image 204) by loss computation 206. The loss computed by loss computation 206 may be used to update parameters of subject-driven image model 130 via backpropagation 208. In some embodiments, backpropagation 208 may update parameters of multimodal encoder 108, queries 110, text encoder 120, and/or image model 122. Loss computation 206 may include, for example, a cross entropy loss function. The subject representation learning stage is not specific to a certain subject, and is performed using images of a variety of subjects. During this training stage multiple input subject images 102 may be used for each output image 124 by averaging together encoded subject representations as described in FIG. 1. In some embodiments, some percentage of the time (e.g., 15%) subject embedding 116 is randomly dropped from the combined prompt in order to help preserve the original text-to-image generation capability.

After the second pre-training stage (subject representation learning stage), zero-shot image generation may be performed using one or more subject images without any additional fine-tuning of the subject-driven image generation model. However, better performance may be achieved in some circumstances with an additional subject-specific fine-tuning stage.

The fine-tuning stage may be performed similar to the subject representation learning stage, but for a specific subject. For example, a user may provide one or more input subject images 102 (e.g., a dog). Parameters of the subject-driven image generation model 130 may be updated based on loss computation 206 comparing images generated based on the input images to ground-truth images. The ground-truth images for the fine-tuning stage may be the same as the input images, without any background replacement. Background replacement may be used as in the subject representation learning stage, however sufficient performance may be achieved without background replacement, while saving the additional inference time required to generate the background replacements. Without background replacement, effectively the subject-driven image generation model is trained to replicate the input image. Only a predetermined number of fine-tuning steps are performed to prevent overfitting.

In some embodiments, backpropagation 208 during subject-specific fine-tuning may update parameters of multimodal encoder 108, queries 110, text encoder 120, and/or image model 122. In some embodiments, text encoder 120 may be trained during the subject representation learning stage, and frozen during the fine-tuning stage to prevent over-fitting to a specific subject. During fine-tuning, image encoder 104, text encoder 106, queries 110, feed forward 114, and/or multimodal encoder 108 may be frozen (i.e., their parameters unchanged). When these parameters are frozen, a single subject embedding 116 (based on a single image or averaged for multiple images) may be generated once and cached to be reused during fine-tuning without needing another forward pass. This may allow for faster fine-tuning.

As discussed above, these methods may be used with a variety of image models 122. For example, ControlNet as described in Zhang et al., Adding conditional control to text-to-image diffusion models, arXiv:2302.05543, 2023. Using ControlNet, simultaneous structure-controlled and subject-controlled generation is possible. A conditioning image may be provided which may provide the structure of the output image, while the input subject image 102 provides the subject which may be included in the final output image. In this way, the subject-driven image model 130 takes into account the input structure condition from the conditioning image, such as edge maps and depth maps, in addition to the subject cues.

In another example, subject-driven image model 130 may be integrated with an image editing model which edits an original image with subject-specific visuals. To edit an image, a subject may be identified for replacement in the original image (e.g., "dog"). Next, cross-attention maps from the original generation are used while generating new attention maps for the inserted subject embeddings. Denoising latents are mixed at each step based on the extracted editing mask. Namely, latents of the unedited regions are from the original generation whereas latents of the edited regions are from the subject-driven generation. In this way, an edited image may be generated with subject-specific visuals while also preserving the unedited regions.

Figure 3:
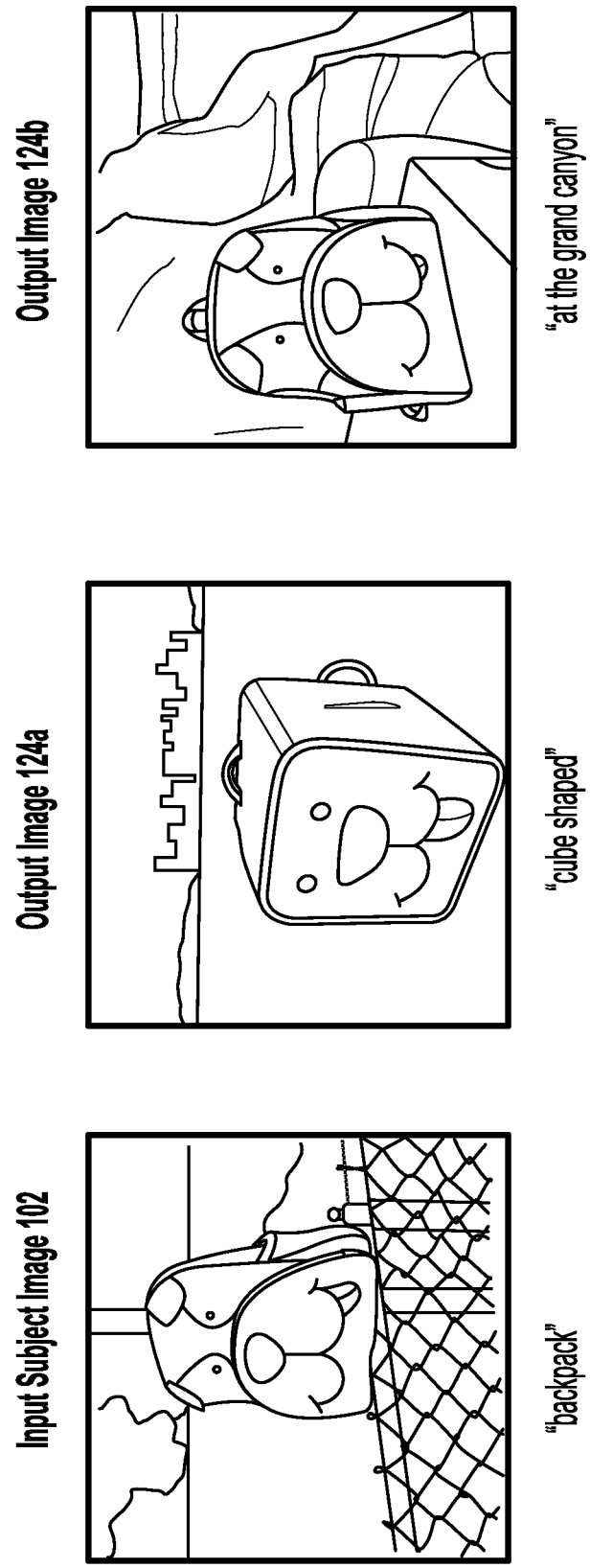
FIG. 3 illustrates exemplary subject-driven generated images according to some embodiments.

FIG. 3 illustrates exemplary subject-driven generated images according to some embodiments. Exemplary input subject image 102 illustrates a backpack which resembles a dog face. Exemplary input subject image 102 is shown on a background which includes a chain-link fence and other features. Exemplary output images 124a and 124b illustrate a "cube shaped" image of the back pack, and the backpack "at the grand canyon" respectively. For example, output image 124a may be generated by subject-driven image model 130 using input subject image 102 with subject text 112 "backpack" and text prompt 118 "cube shaped". In another example, output image 124b may be generated by subject-driven image model 130 using input subject image 102 with subject text 112 "backpack" and text prompt 118 "at the grand canyon".

Computer and Network Environment

Figure 4A:
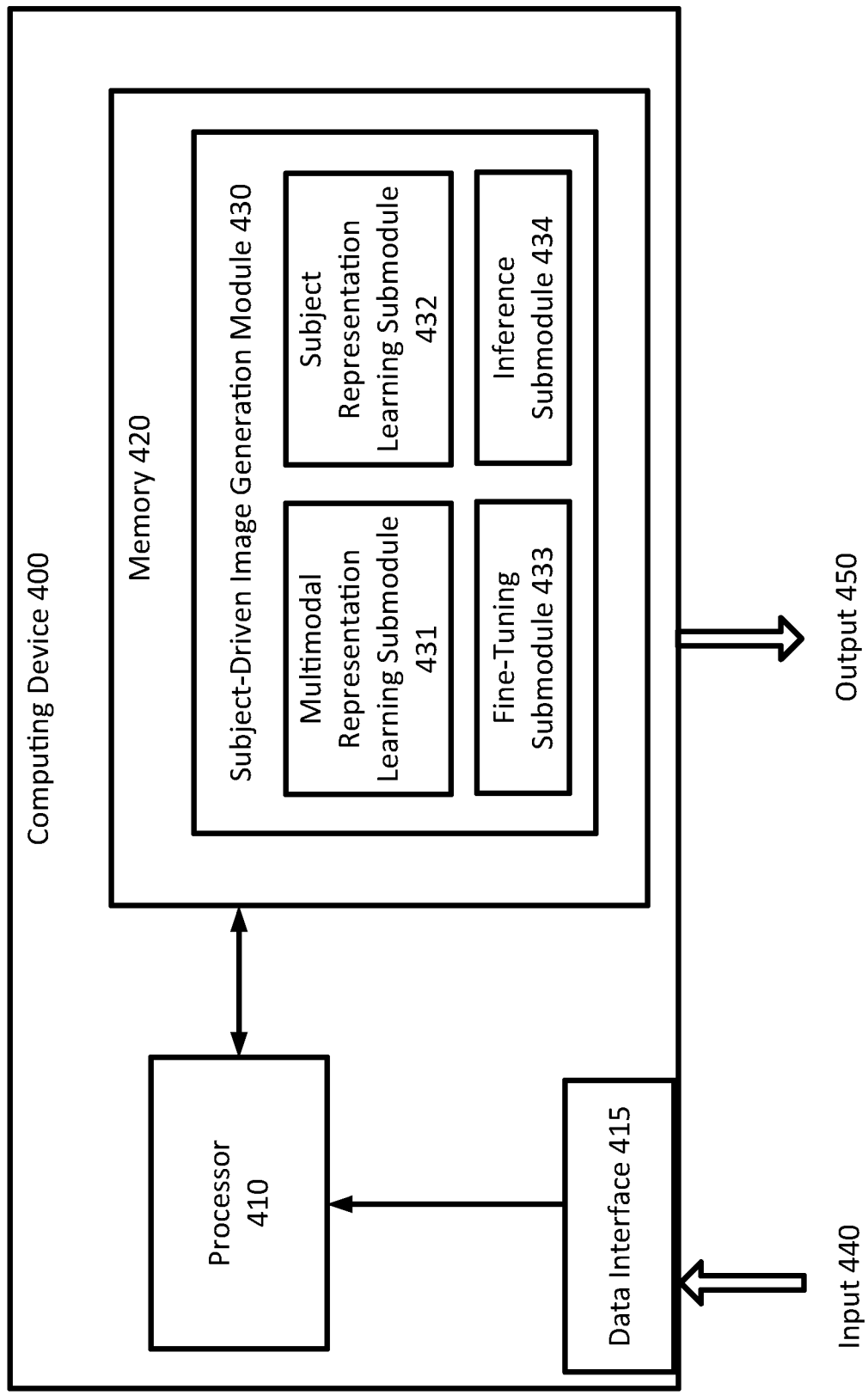
FIG. 4A is a simplified diagram illustrating a computing device implementing the subject-driven image model framework described in FIGS. 1-2, according to some embodiments.

FIG. 4A is a simplified diagram illustrating a computing device 400 implementing the subject-driven image model framework described in FIGS. 1-2, according to some embodiments. As shown in FIG. 4A, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for subject-driven image generation module 430 that may be used to implement and/or emulate the systems and models, and/or to implement any of the methods described further herein. subject-driven image generation module 430 may receive input 440 such as an input training data (e.g., images, subject captions, and/or images with replaced backgrounds) via the data interface 415 and generate an output 450 which may be a generated image.

The data interface 415 may comprise a communication interface, a user interface (such as a voice input interface, a graphical user interface, and/or the like). For example, the computing device 400 may receive the input 440 (such as a training dataset) from a networked database via a communication interface. Or the computing device 400 may receive the input 440, such as input subject images, from a user via the user interface.

In some embodiments, the subject-driven image generation module 430 is configured to generate an image of a rendition of a subject based on one or more input subject images and a text prompt. The subject-driven image generation module 430 may further include multimodal representation learning submodule 431. Multimodal representation learning submodule 431 may be configured to train a multimodal encoder (e.g., multimodal encoder 108) to generate a vector representation of an input image based on an associated text as described in FIG. 1. The subject-driven image generation module 430 may further include subject representation learning submodule 432. Subject representation learning submodule 432 may be configured to further train the multimodal encoder (e.g., multimodal encoder 108) to generate an output vector representation of a subject based on an input subject image (e.g., input subject image 102) and a subject text (e.g., subject text 112) as described in FIG. 1. The subject-driven image generation module 430 may further include fine-tuning submodule 433. Fine-tuning submodule 433 may be configured to fine-tune parameters of the subject-driven image model based on a specific subject as represented in one or more subject images as described in FIG. 1. The subject-driven image generation module 430 may further include inference submodule 434. Inference submodule 434 may be configured to generate an output image based on an input subject image, subject text, and text prompt as described in FIG. 1.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 4B:
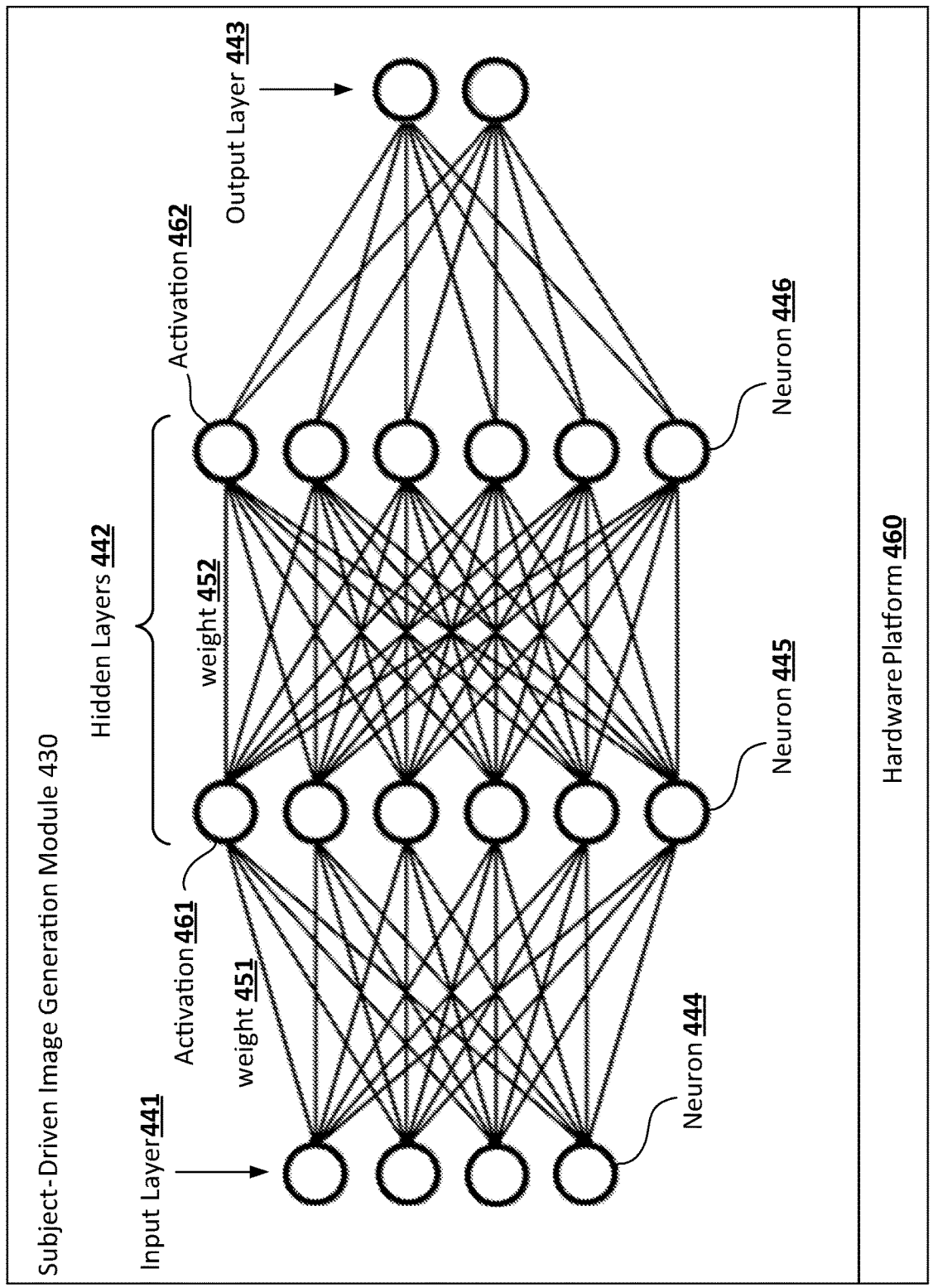
FIG. 4B is a simplified diagram illustrating a neural network structure, according to some embodiments.

FIG. 4B is a simplified diagram illustrating the neural network structure implementing the subject-driven image generation module 430 described in FIG. 4A, according to some embodiments. In some embodiments, the subject-driven image generation module 430 and/or one or more of its submodules 431-434 may be implemented at least partially via an artificial neural network structure shown in FIG. 4B. The neural network comprises a computing system that is built on a collection of connected units or nodes, referred to as neurons (e.g., 444, 445, 446). Neurons are often connected by edges, and an adjustable weight (e.g., 451, 452) is often associated with the edge. The neurons are often aggregated into layers such that different layers may perform different transformations on the respective input and output transformed input data onto the next layer.

For example, the neural network architecture may comprise an input layer 441, one or more hidden layers 442 and an output layer 443. Each layer may comprise a plurality of neurons, and neurons between layers are interconnected according to a specific topology of the neural network topology. The input layer 441 receives the input data (e.g., 440 in FIG. 4A), such as an input subject image. The number of nodes (neurons) in the input layer 441 may be determined by the dimensionality of the input data (e.g., the length of a vector of the image representation. Each node in the input layer represents a feature or attribute of the input.

The hidden layers 442 are intermediate layers between the input and output layers of a neural network. It is noted that two hidden layers 442 are shown in FIG. 4B for illustrative purpose only, and any number of hidden layers may be utilized in a neural network structure. Hidden layers 442 may extract and transform the input data through a series of weighted computations and activation functions.

For example, as discussed in FIG. 4A, the subject-driven image generation module 430 receives an input 440 of an input subject image and image generation prompt and transforms the input into an output 450 of a generated image of a rendition of the subject based on the prompt. To perform the transformation, each neuron receives input signals, performs a weighted sum of the inputs according to weights assigned to each connection (e.g., 451, 452), and then applies an activation function (e.g., 461, 462, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 441 is transformed into rather different values indicative data characteristics corresponding to a task that the neural network structure has been designed to perform.

The output layer 443 is the final layer of the neural network structure. It produces the network's output or prediction based on the computations performed in the preceding layers (e.g., 441, 442). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the subject-driven image generation module 430 and/or one or more of its submodules 431-434 may comprise the transformative neural network structure of layers of neurons, and weights and activation functions describing the non-linear transformation at each neuron. Such a neural network structure is often implemented on one or more hardware processors 410, such as a graphics processing unit (GPU). An example neural network may be a diffusion model U-Net, and/or the like.

In one embodiment, the subject-driven image generation module 430 and its submodules 431-434 may be implemented by hardware, software and/or a combination thereof. For example, the subject-driven image generation module 430 and its submodules 431-434 may comprise a specific neural network structure implemented and run on various hardware platforms 460, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 460 used to implement the neural network structure is specifically configured based on factors such as the complexity of the neural network, the scale of the tasks (e.g., training time, input data scale, size of training dataset, etc.), and the desired performance.

In one embodiment, the neural network based subject-driven image generation module 430 and one or more of its submodules 431-434 may be trained by iteratively updating the underlying parameters (e.g., weights 451, 452, etc., bias parameters and/or coefficients in the activation functions 461, 462 associated with neurons) of the neural network based on a loss function. For example, during forward propagation, the training data such as subject images, subject descriptions, image generation prompts, and subject images with replaced backgrounds are fed into the neural network. The data flows through the network's layers 441, 442, with each layer performing computations based on its weights, biases, and activation functions until the output layer 443 produces the network's output 450. In some embodiments, output layer 443 produces an intermediate output on which the network's output 450 is based.

The output generated by the output layer 443 is compared to the expected output (e.g., a "ground-truth" such as the corresponding subject image with a replace background) from the training data, to compute a loss function that measures the discrepancy between the predicted output and the expected output. For example, the loss function may be a cross entropy loss. Given the loss, the negative gradient of the loss function is computed with respect to each weight of each layer individually. Such negative gradient is computed one layer at a time, iteratively backward from the last layer 443 to the input layer 441 of the neural network. These gradients quantify the sensitivity of the network's output to changes in the parameters. The chain rule of calculus is applied to efficiently calculate these gradients by propagating the gradients backward from the output layer 443 to the input layer 441.

Parameters of the neural network are updated backwardly from the last layer to the input layer (backpropagating) based on the computed negative gradient using an optimization algorithm to minimize the loss. The backpropagation from the last layer 443 to the input layer 441 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as generating images on new subjects.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network thus improves neural network technology in image generation.

Figure 5:
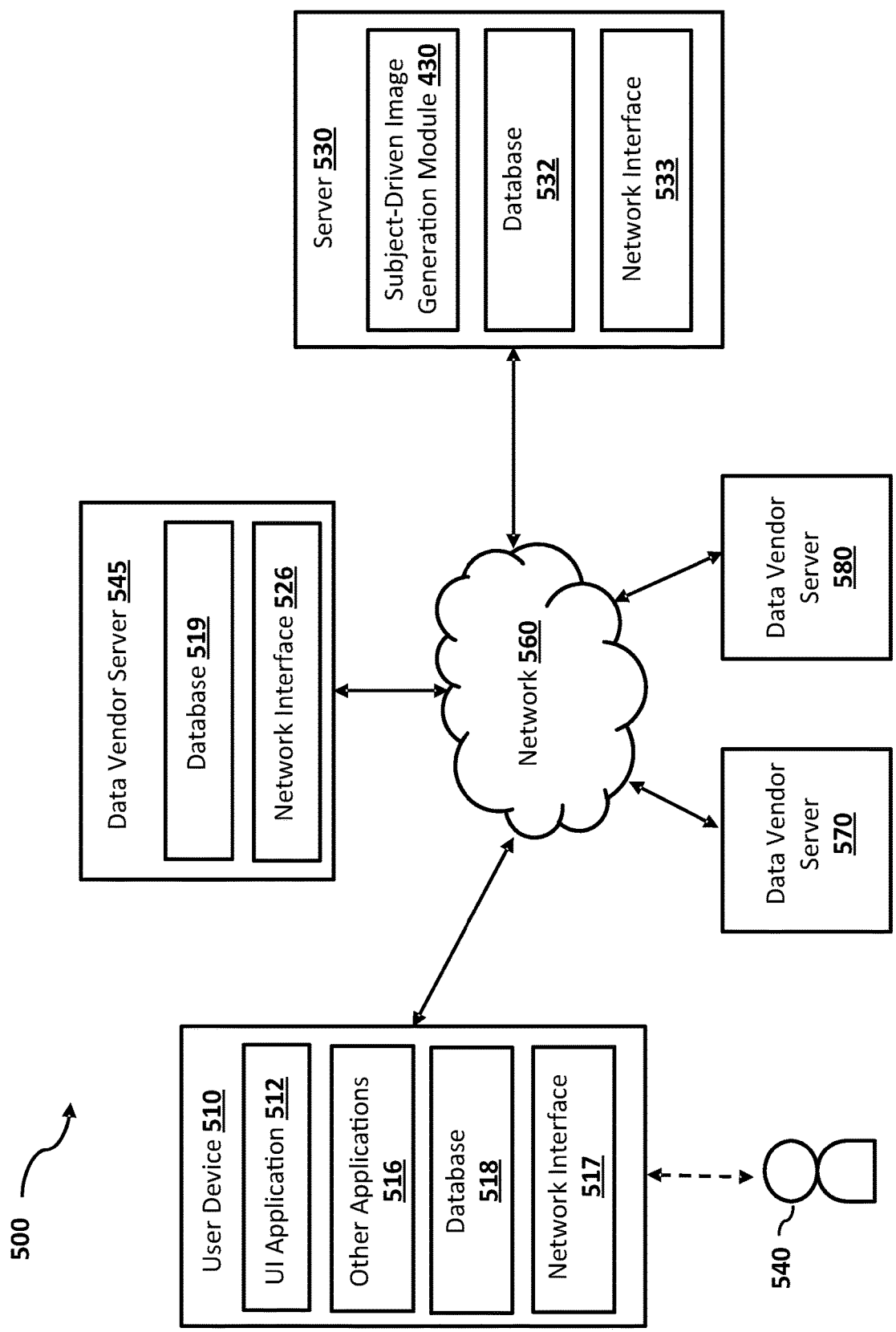
FIG. 5 is a simplified block diagram of a networked system suitable for implementing the subject-driven image model framework described in FIGS. 1-2 and other embodiments described herein.

FIG. 5 is a simplified block diagram of a networked system 500 suitable for implementing the subject-driven image model framework described in FIGS. 1-2 and other embodiments described herein. In one embodiment, system 500 includes the user device 510 which may be operated by user 540, data vendor servers 545, 570 and 580, server 530, and other forms of devices, servers, and/or software components that operate to perform various methodologies in accordance with the described embodiments. Exemplary devices and servers may include device, stand-alone, and enterprise-class servers which may be similar to the computing device 400 described in FIG. 4A, operating an OS such as a MICROSOFT® OS, a UNIX® OS, a LINUX® OS, or other suitable device and/or server-based OS. It can be appreciated that the devices and/or servers illustrated in FIG. 5 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 510, data vendor servers 545, 570 and 580, and the server 530 may communicate with each other over a network 560. User device 510 may be utilized by a user 540 (e.g., a driver, a system admin, etc.) to access the various features available for user device 510, which may include processes and/or applications associated with the server 530 to receive an output data anomaly report.

User device 510, data vendor server 545, and the server 530 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 500, and/or accessible over network 560.

User device 510 may be implemented as a communication device that may utilize appropriate hardware and software configured for wired and/or wireless communication with data vendor server 545 and/or the server 530. For example, in one embodiment, user device 510 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 510 of FIG. 5 contains a user interface (UI) application 512, and/or other applications 516, which may correspond to executable processes, procedures, and/or applications with associated hardware. For example, the user device 510 may receive a message indicating a generated image from the server 530 and display the message via the UI application 512. In other embodiments, user device 510 may include additional or different modules having specialized hardware and/or software as required.

In various embodiments, user device 510 includes other applications 516 as may be desired in particular embodiments to provide features to user device 510. For example, other applications 516 may include security applications for implementing client-side security features, programmatic client applications for interfacing with appropriate application programming interfaces (APIs) over network 560, or other types of applications. Other applications 516 may also include communication applications, such as email, texting, voice, social networking, and IM applications that allow a user to send and receive emails, calls, texts, and other notifications through network 560. For example, the other application 516 may be an email or instant messaging application that receives a prediction result message from the server 530. Other applications 516 may include device interfaces and other display modules that may receive input and/or output information. For example, other applications 516 may contain software programs for asset management, executable by a processor, including a graphical user interface (GUI) configured to provide an interface to the user 540 to view generated images.

User device 510 may further include database 518 stored in a transitory and/or non-transitory memory of user device 510, which may store various applications and data and be utilized during execution of various modules of user device 510. Database 518 may store user profile relating to the user 540, predictions previously viewed or saved by the user 540, historical data received from the server 530, and/or the like. In some embodiments, database 518 may be local to user device 510. However, in other embodiments, database 518 may be external to user device 510 and accessible by user device 510, including cloud storage systems and/or databases that are accessible over network 560.

User device 510 includes at least one network interface component 517 adapted to communicate with data vendor server 545 and/or the server 530. In various embodiments, network interface component 517 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 545 may correspond to a server that hosts database 519 to provide training datasets including training images and prompts to the server 530. The database 519 may be implemented by one or more relational database, distributed databases, cloud databases, and/or the like.

The data vendor server 545 includes at least one network interface component 526 adapted to communicate with user device 510 and/or the server 530. In various embodiments, network interface component 526 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 545 may send asset information from the database 519, via the network interface 526, to the server 530.

The server 530 may be housed with the subject-driven image generation module 430 and its submodules described in FIG. 4A. In some implementations, subject-driven image generation module 430 may receive data from database 519 at the data vendor server 545 via the network 560 to generate images. The generated images may also be sent to the user device 510 for review by the user 540 via the network 560.

The database 532 may be stored in a transitory and/or non-transitory memory of the server 530. In one implementation, the database 532 may store data obtained from the data vendor server 545. In one implementation, the database 532 may store parameters of the subject-driven image generation module 430. In one implementation, the database 532 may store previously generated images, and the corresponding input feature vectors.

In some embodiments, database 532 may be local to the server 530. However, in other embodiments, database 532 may be external to the server 530 and accessible by the server 530, including cloud storage systems and/or databases that are accessible over network 560.

The server 530 includes at least one network interface component 533 adapted to communicate with user device 510 and/or data vendor servers 545, 570 or 580 over network 560. In various embodiments, network interface component 533 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 560 may be implemented as a single network or a combination of multiple networks. For example, in various embodiments, network 560 may include the Internet or one or more intranets, landline networks, wireless networks, and/or other appropriate types of networks. Thus, network 560 may correspond to small scale communication networks, such as a private or local area network, or a larger scale network, such as a wide area network or the Internet, accessible by the various components of system 500.

Figure 6:
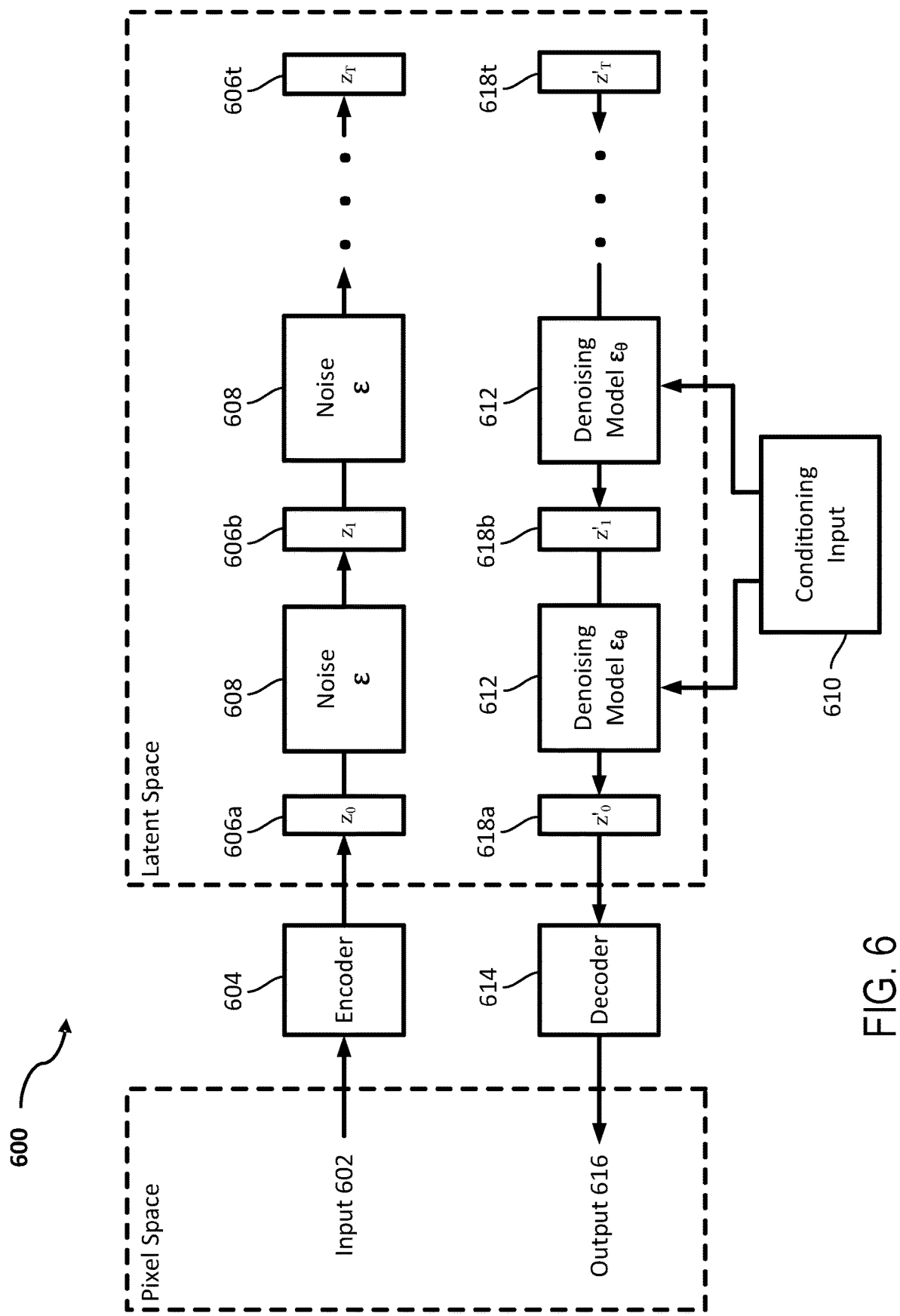
FIG. 6 is a simplified diagram illustrating an exemplary training framework for a denoising diffusion model for generating or editing an image given a conditioning input such as a text prompt according to some embodiments.

FIG. 6 is a simplified diagram illustrating an exemplary training framework 600 for a denoising diffusion model for generating or editing an image given a conditioning input such as a text prompt. In some embodiments, image model 122 is a diffusion model which includes a denoising model 612 which may be a U-Net, and is trained or pretrained according to training framework 600. In some embodiments, image model 122 is pretrained as described as follows with respect to FIG. 6, and further trained/fine-tuned according to the framework described in FIGS. 1-2 where it may be jointly trained with additional models. In one embodiment, a denoising diffusion model is trained to generate an image (e.g., output 616) based on a user input (e.g., a text prompt in conditioning input 610). At inference, the denoising diffusion model may receive a text prompt describing image content, and start with a random noise vector as a seed vector, and the denoising model progressively removes "noise" from the seed vector as conditioned by the user input (e.g., text prompt) such that the resulting image may gradually align with the user input. As described in FIG. 1, the conditioning input may be a combined text prompt 118 and subject embedding 116. Completely removing the noise in a single step would be infeasibly difficult computationally. For this reason, the denoising model is trained to remove a small amount of noise, and the denoising step is repeated iteratively so that over a number of iterations (e.g., 50 iterations), the image eventually becomes clear.

Framework 600 illustrates how such a diffusion model may be trained to generate an image given a prompt by gradually removing noise from a seed vector. The top portion of the illustrated framework 600 including encoder 604 and the noise ε 608 steps may only be used during the training process, and not at inference, as described below. A training dataset may include a variety of images, which do not necessarily require any annotations, but may be associated with information such as a caption for each image in the training dataset that may be used as a conditioning input 610. A training image may be used as input 602. Encoder 604 may encode input 602 into a latent representation (e.g., a vector) which represents the image.

In some embodiments, a diffusion model may be trained using the pixel-level data directly. In other embodiments, a diffusion model may be trained on scaled down versions of images. Generally some form of encoder 604, however, is desirable so that the image is in a format which is more easily consumed by the denoising model $\varepsilon_\theta$ 612. The remaining description of framework 600 presumes encoder 604 generates a latent vector representation of input 602.

Latent vector representation $z_0$ 606a represents the first encoded latent representation of input 602. Noise ε 608 is added to the representation $z_0$ 606a to produce representation $z_1$ 606b. Noise ε 608 is then added to representation $z_1$ 606b to produce an even noisier representation. This process is repeated T times (e.g., 50 iterations) until it results in a noised latent representation $z_T$ 606t. The random noise ε 608 added at each iteration may be a random sample from a probability distribution such as Gaussian distribution. The amount (i.e., variance) of noise ε 608 added at each iteration may be constant, or may vary over the iterations. The amount of noise ε 608 added may depend on other factors such as image size or resolution.

This process of incrementally adding noise to latent image representations effectively generates training data that is used in training the diffusion denoising model 612, as described below. As illustrated, denoising model $\varepsilon_\theta$ 612 is iteratively used to reverse the process of noising latents (i.e., perform reverse diffusion) from $z'_T$ 618t to $z'_0$ 618a. Denoising model $\varepsilon_\theta$ 612 may be a neural network based model, which has parameters that may be learned. Input to denoising model $\varepsilon_\theta$ 612 may include a noisy latent representation (e.g., noised latent representation $z_T$ 606t), and conditioning input 610 such as a text prompt describing desired content of an output image, e.g., "a hand holding a globe." As shown, the noisy latent representation may be repeatedly and progressively fed into denoising model 612 to gradually remove noise from the latent representation vector based on the conditioning input 610, e.g., from $z'_T$ 618t to $z'_0$ 618a.

Ideally, the progressive outputs of repeated denoising models $\varepsilon_\theta$ 612 $z'_T$ 618t to $z'_0$ 618a may be an incrementally denoised version of the input latent representation $z'_T$ 618t, as conditioned by a conditioning input 610. The latent image representation produced using denoising model $\varepsilon_\theta$ 612 may be decoded using decoder 614 to provide an output 616 which is the denoised image.

In one embodiment, the output image 616 is then compared with the input training image 602 to compute a loss for updating the denoising model 612 via back propagation. In another embodiment, the latent representation 606a of input 602 may be compared with the denoised latent representation 618a to compute a loss for training. In another embodiment, a loss objective may be computed comparing the noise actually added (e.g., by noise ε 608) with the noise predicted by denoising model $\varepsilon_\theta$ 612. Denoising model $\varepsilon_\theta$ 612 may be trained based on this loss objective (e.g., parameters of denoising model $\varepsilon_\theta$ 612 may be updated in order to minimize the loss by gradient descent using backpropagation). Note that this means during the training process of denoising model $\varepsilon_\theta$ 612, an actual denoised image does not necessarily need to be produced (e.g., output 616 of decoder 614), as the loss is based on each intermediate noise estimation, not necessarily the final image.

In one embodiment, conditioning input 610 may include a description of the input image 602, and in this way denoising model $\varepsilon_\theta$ 612 learns to reproduce the image described. Alternatively (or in addition), conditioning input 610 may include a text prompt, a conditioning image, an attention map, or other conditioning inputs. These inputs may be encoded in some way before being used by denoising model $\varepsilon_\theta$ 612. For example, a conditioning image may be encoded using an encoder similar to encoder 604. Conditioning input 610 may also include a time step, which may be used to provide the model with a general estimate of how much noise remains in the image, and the time step may increment (or decrement) for each iteration.

In some embodiments, denoising model $\varepsilon_\theta$ 612 may be implemented through a structure referred to as "U-Net." The U-Net structure may include a series of convolutional layers and pooling layers which generate progressively lower resolution multi-channel feature maps. Each pooling layer and an associated one or more convolutional layers may be considered an encoder. The convolutional and pooling layers (i.e., encoders) may be followed by a series of up-sampling layers and convolutional layers which generate progressively higher resolution multi-channel feature maps. Each up-sampling layer and an associated one or more convolutional layers may be considered a decoder. The U-Net may also include skip connections, where outputs of each encoder layer are concatenated with the corresponding decoder layer, skipping the intermediate encoder/decoder layers. Skip connections allow information about the precise location of features extracted by convolutional (encoder) layers. The convolutional kernels for convolution layers, and up-sampling functions for the up-sampling layers may be learned during a training process. Conditioning inputs (e.g., images or a natural language prompt) may be used to condition the function of a U-Net. For example, conditioning inputs may be encoded and cross-attention may be applied between the encoded conditioning inputs and the feature maps at the encoder/decoder layers.

The direct output of denoising model $\varepsilon_\theta$ 612 (e.g., when implemented as a U-Net) may be an estimation of the noise present in the input latent representation, or more generally a noise distribution. In this sense, the direct output may not by a latent representation of an image, but rather of the noise. Using this estimated noise, however, an incrementally denoised image representation may be produced which may be an input to the next iteration of denoising model $\varepsilon_\theta$ 612.

At inference, denoising model $\varepsilon_\theta$ 612 may be used to denoise a latent image representation given a conditioning input 610. Rather than a noisy latent image representation $z_T$ 606$t$, the input to the sequence of denoising models may be a randomly generated vector which is used as a seed. Different images may be generated by providing different random starting seeds. The resulting denoised latent image representation after T denoising model steps may be decoded by a decoder (e.g., decoder 614) to produce an output 616 of a denoised image. For example, conditioning input may include a description of an image, and the output 616 may be an image which is aligned with that description.

Note that while denoising model $\varepsilon_\theta$ 612 is illustrated as the same model being used iteratively, distinct models may be used at different steps of the process. Further, note that a "denoising diffusion model" may refer to a single denoising model $\varepsilon_\theta$ 612, a chain of multiple denoising models $\varepsilon_\theta$ 612, and/or the iterative use of a single denoising model $\varepsilon_\theta$ 612. A "denoising diffusion model" may also include related features such as decoder 614, any pre-processing that occurs to conditioning input 610, etc. This framework 600 of the training and inference of a denoising diffusion model may further be modified to provide improved results and/or additional functionality, for example as in embodiments described herein.

Example Work Flows

Figure 7:
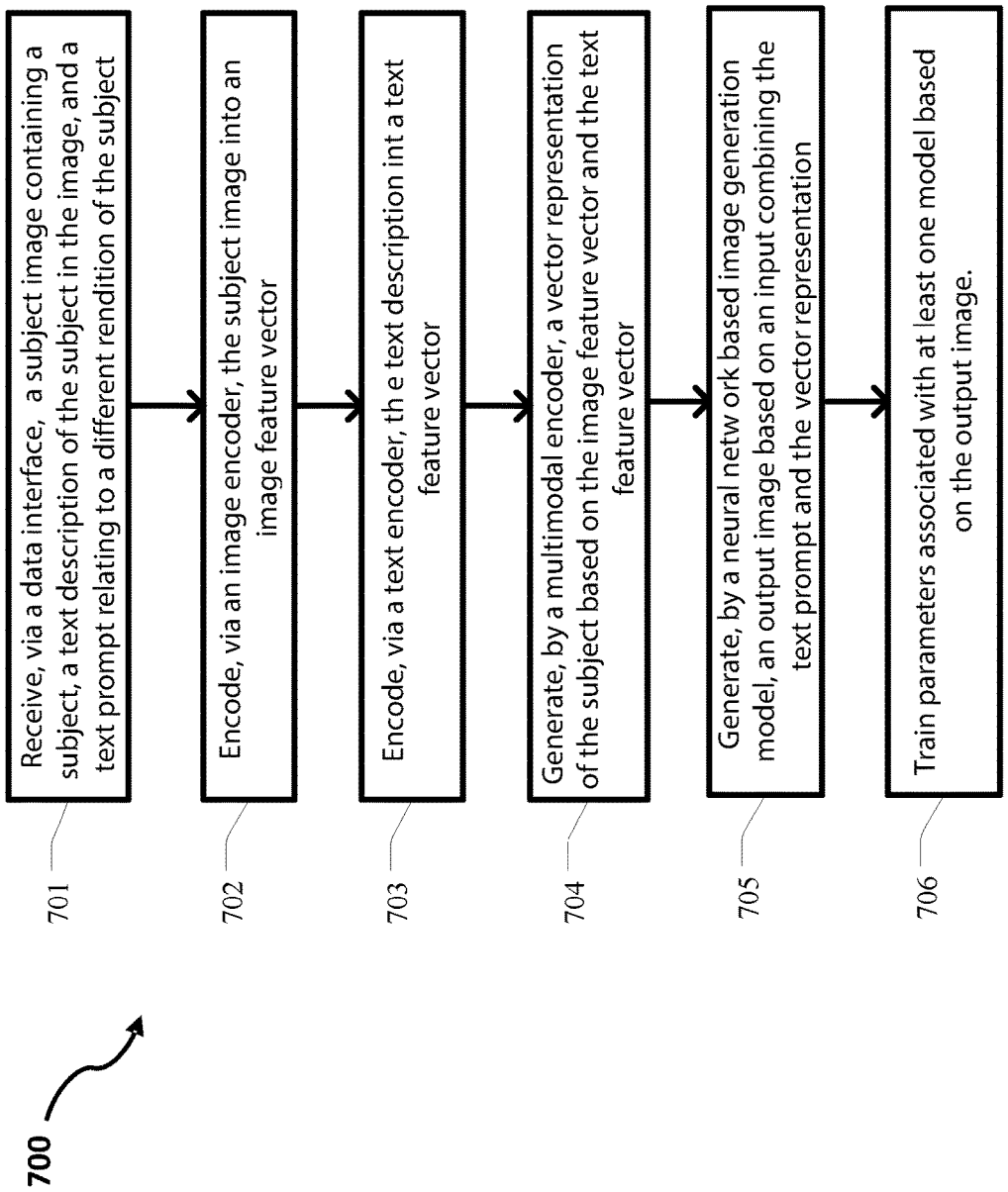
FIG. 7 is an example logic flow diagram illustrating a method of subject-driven image generation based on the framework shown in FIGS. 1-2, according to some embodiments.

FIG. 7 is an example logic flow diagram illustrating a method 700 of subject-driven image generation based on the framework shown in FIGS. 1-2, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the subject-driven image generation module 430 (e.g., FIGS. 4A and 5) that performs inference and/or training of a subject-driven image generation model.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 701, a system (e.g., computing device 400 or server 530) receives, via a data interface (e.g., data interface 415 or network interface 533), a subject image (e.g., input subject image 102) containing a subject, a text description of the subject in the image (e.g., subject text 112), and a text prompt relating to a different rendition of the subject (e.g., text prompt 118).

At step 702, the system encodes, via an image encoder (e.g., image encoder 104), the subject image into an image feature vector.

At step 703, the system encodes, via a text encoder (e.g., text encoder 106), the text description into a text feature vector.

At step 704, the system generates, by a multimodal encoder (e.g., multimodal encoder 108), a vector representation (e.g., subject embedding 116) of the subject based on the image feature vector and the text feature vector. In some embodiments, the system generates, by the multimodal encoder, a plurality of vector representations of the subject based on a plurality of image feature vectors, and the vector representation is an average of the plurality of vector representations. The average of the plurality of vector representations may be cached so that it may be reused for generating images based on different text prompts for the same subject. In some embodiments, the vector representation is also passed through a feed forward model (e.g., feed forward 114) which may be a multi-layer perceptron (e.g., as illustrated in FIG. 4B). In some embodiments feed forward 114 consists of two linear layers.

At step 705, the system generates, by a neural network based image generation model (e.g., image model 122), an output image (e.g., output image 124) based on an input combining the text prompt and the vector representation. In some embodiments, the text prompt and the vector representation are combined by being concatenated and input to a text encoder (e.g., text encoder 120) which may be part of the image generation model. In some embodiments, the combined text prompt and vector representation are used as the conditioning prompt of a denoising diffusion model. In some embodiments, the denoising diffusion model also takes a conditioning image as an input which is used to guide the generation of the output image. The conditioning image may be received via the data interface.

At step 706, the system trains parameters associated with at least one model based on the output image. In some embodiments, training parameters includes training jointly the multimodal encoder, the text encoder of the subject text and/or the text encoder of the text prompt, and the neural network based image generation model based on a comparison of the output image and a modified image containing the subject on a different background than a background in the subject image. In some embodiments, generating the vector representation is further based on a plurality of query vectors (e.g., queries 110), and the training includes updating the plurality of query vectors. Queries 110 may interact with subject text 112 through self-attention layers, and interact with image features of input subject image 102 through cross-attention layer. In some embodiments, training parameters includes training the neural network based image generation model based on a comparison of the output image and the subject image. In some embodiments, parameters of the text encoder are frozen while training the neural network based image generation model.

Example Results

FIGS. 8-11 provide charts illustrating exemplary performance of different embodiments described herein. For multimodal representation learning, experiments followed BLIP-2 and pretrained the model on 129M image-text pairs, including 115M image-text pairs. As aforementioned, experiments used 16 queries to learn subject representation. For subject representation learning, experiments used a subset of 292K images from OpenImage-V6 as described in Kuznetsove et al., The open images dataset v4: Unified image classification, object detection, and visual relationship detection at scale, International Journal of Computer Vision, 128(7):1956-1981, 2020. Each of the OpenImage-V6 images utilized in the experiments containing a salient subject. Experiments also removed images with human-related subjects. BLIP-2 OPT6.7B was used to generate captions as text prompts. 59K background images from the web were used to synthesize subject inputs. Stable Diffusion v1-5 was used as the foundation diffusion model. S total batch size 16 was used with a constant learning rate 2e-6 for 500K steps using AdamW optimizer as described in Loshchilov and flutter, Decoupled weight decay regularization, In International Conference on Learning Representations, 2017. Subject images for experiments are from the DreamBench dataset as described in Ruiz et al., arXiv: 2208.12242, 2022

Baseline models for comparison include Textual Inversion as described in Gal et al., An image is worth one word: Personalizing text-to-image generation using textual inversion, arXiv: 2208.01618, 2022. Another baseline model for comparison was Re-Imagen as described in Chen et al., Re-imagen: Retrieval-augmented text-to-image generator, arXiv:2209.14491, 2022. Another baseline model for comparison was DreamBooth as described in Ruiz et al., Dreambooth: Fine tuning text-to-image diffusion models for subject-driven generation, arXiv: 2208.12242, 2022. Metrics used in the experiments include DINO, CLIP-I, and CLIP-T scores as described in Ruiz et al., Dreambooth: Fine tuning text-to-image diffusion models for subject-driven generation, arXiv: 2208.12242, 2022.

FIG. 8 provides a chart illustrating exemplary performance of at least one embodiment described herein. Specifically, FIG. 8 illustrates quantitative comparisons on DreamBench. Average metrics and differences are illustrated across 10 experiment runs with different sets of random seeds, in zero-shot (ZS) and fine-tuning (FT) setups. DINO and CLIP-I scores measure subject alignment and CLIP-T measures image-text alignment. 4 images were generated for each text prompt, amounting in total 3,000 images for all the subjects. Generations were repeated with 10 fixed set of random seeds and report average scores. The overall results are consistent with the qualitative findings, where BLIP-Diffusion is superior to Textual Inversion and Re-Imagen while showing comparable performance to DreamBooth while requiring less fine-tuning effort. In particular, the zero-shot generations are better than fine-tuned Textual Inversion results. Additionally, we show per-subject metrics and observe that fine-tuning significantly improves subject alignment. In the meanwhile, fine-tuning also improves image-text alignment on average. When fine-tuning harms the image-text alignment, it is due to the model overfitting to target inputs thus resulting in generations irrespective of the text prompt. This is in particular an issue when the provided subject images are of limited visual diversity.

Figure 9:
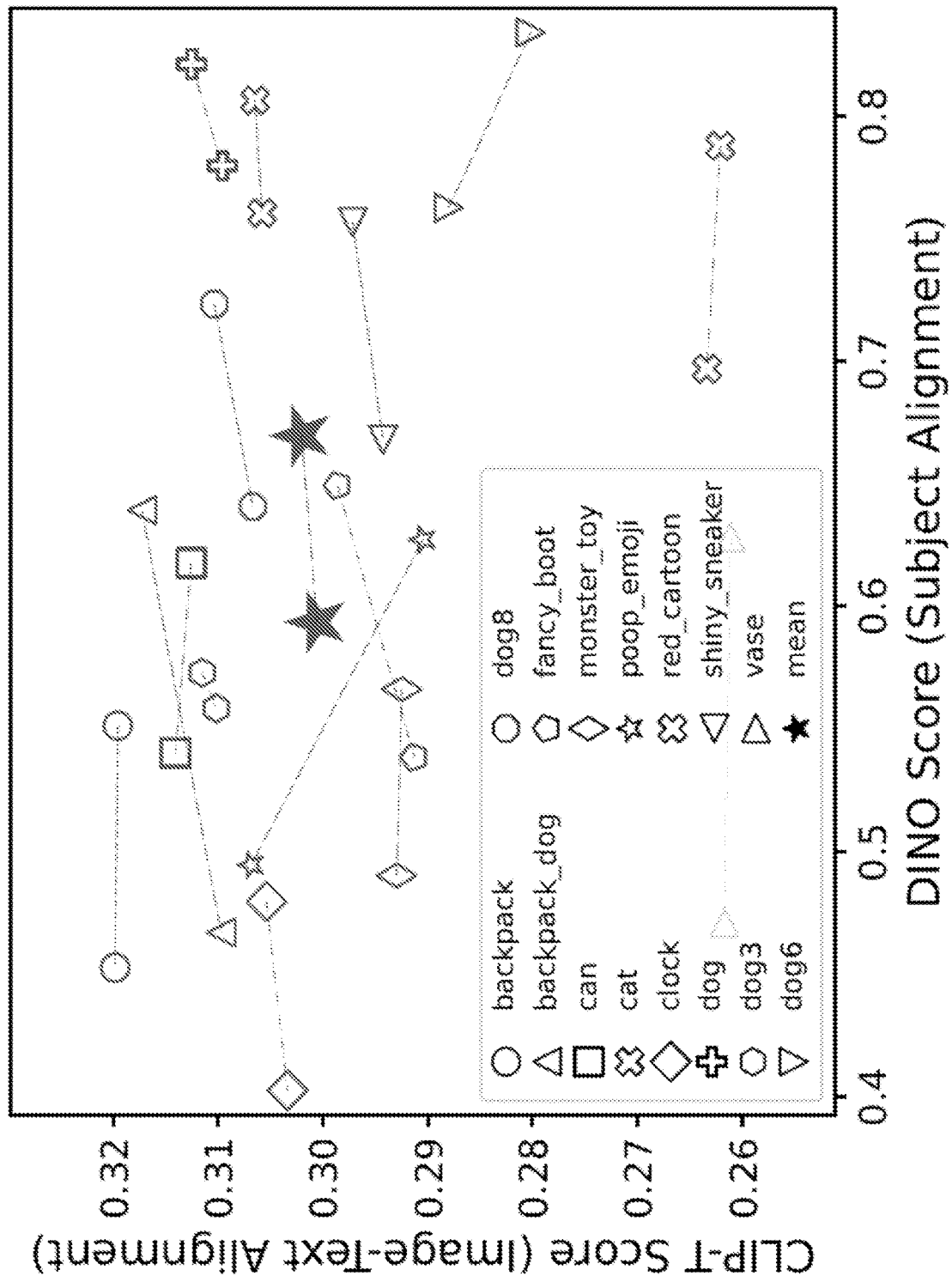

FIG. 9 provides a chart illustrating exemplary performance of at least one embodiment described herein. Specifically, FIG. 9 illustrates the alignment metrics (DINO and CLIP-T) in zero-shot and fine-tuning setups for sample subjects.

FIG. 10 provides a chart illustrating exemplary performance of at least one embodiment described herein. Specifically, FIG. 10 illustrates ablation studies on embodiments described herein. Ablation studies were conducted using 250K subject representation learning steps. FIG. 10 shows zero-shot evaluation results. The findings are: First, it is critical to conduct multimodal representation learning, which bridges the representation gap between subject embeddings and text prompt embeddings. Second, freezing text encoder of the diffusion model worsens the interaction between subject embedding and text embedding. This leads to generations copying subject inputs and not respecting the text prompts. Despite leading to higher subject alignment scores, it does not allow text control, falsifying the task of text-to-image generation. Third, giving subject text to the multimodal encoder is helpful to inject class-specific visual priors, thereby leading to moderate improvement in metrics. Fourth, pre-training with random subject embedding dropping helps to better preserve the diffusion model's generation ability, thus benefiting the results.

Figure 11:
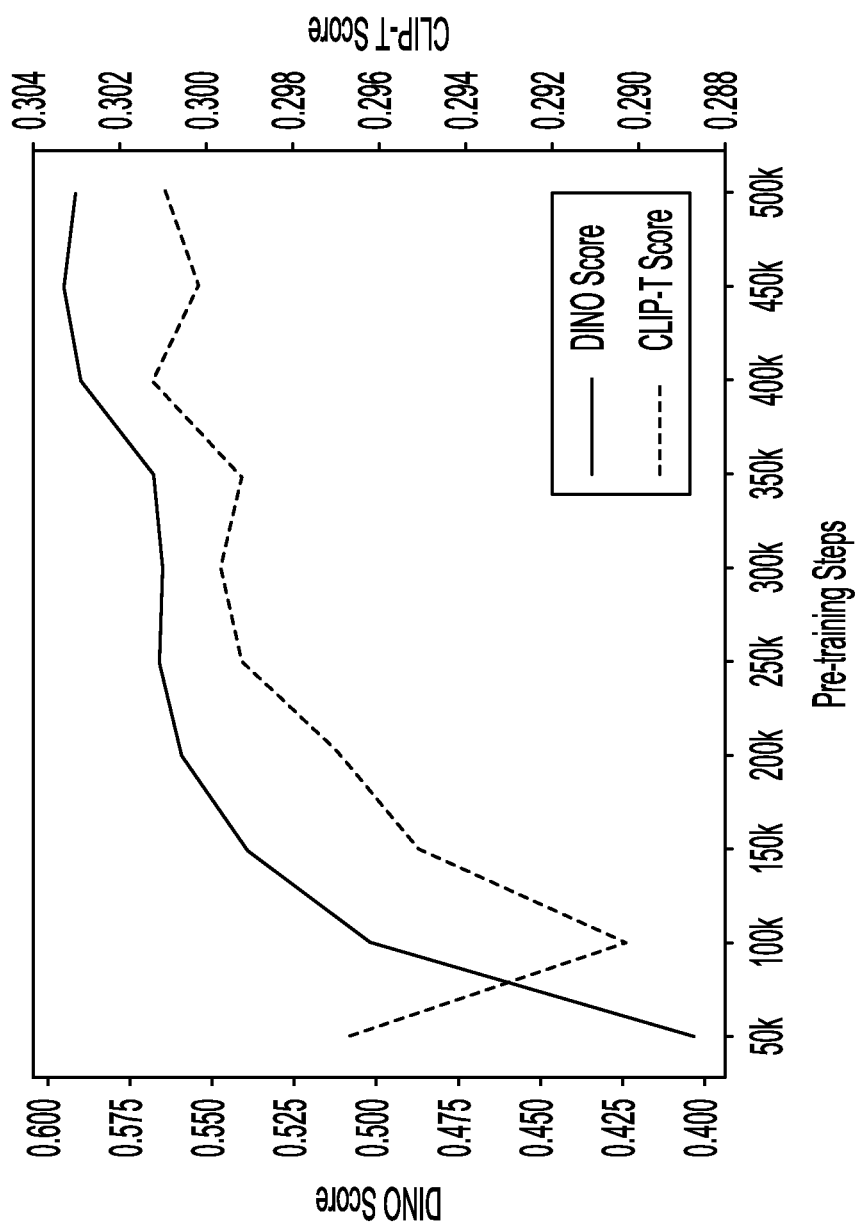

FIG. 11 provides a chart illustrating exemplary performance of at least one embodiment described herein. Specifically, FIG. 11 illustrates DINO and CLIP-T scores for varying numbers of pre-training steps. The chart illustrates that both image-text alignment and subject alignment improve with growing pre-training steps of subject representation learning.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of a subject-driven image generation framework, the method comprising:
receiving, via a data interface, a subject image containing a subject, a text description of the subject in the subject image, and a text prompt relating to a different rendition of the subject;
encoding, via an image encoder of the subject-driven image generation framework, the subject image into an image feature vector;
encoding, via a first text encoder of the subject-driven image generation framework, the text description into a text feature vector;
generating, by a multimodal encoder separated from but connected to both the image encoder and the first text encoder, a vector representation of the subject based on the image feature vector from the image encoder and the text feature vector from the text encoder;
generating, by a second text encoder of the subject-driven image generation framework, an image generation prompt based on the vector representation of the subject and the text prompt; and
generating, by a neural network based image generation model, an output image containing the subject rendered according to the text prompt based on image generation prompt combining the text prompt and the vector representation.

2. The method of claim 1, further comprising:
training jointly the multimodal encoder, the text encoder, and the neural network based image generation model based on a comparison of the output image and a modified image containing the subject on a different background than a background in the subject image.

3. The method of claim 2, wherein the generating the vector representation is further based on a plurality of query vectors, and
wherein the training includes updating the plurality of query vectors.

4. The method of claim 1, further comprising:
training the neural network based image generation model based on a comparison of the output image and the subject image.

5. The method of claim 4, further comprising:
keeping parameters of the text encoder frozen while training the neural network based image generation model.

6. The method of claim 1, further comprising:
generating, by the multimodal encoder, a plurality of vector representations of the subject based on a plurality of image feature vectors,
wherein the vector representation is an average of the plurality of vector representations.

7. The method of claim 1, further comprising:
receiving, via the data interface, a conditioning image,
wherein the generating the output image is further based on the conditioning image.

8. A system for a subject-driven image generation framework, the system comprising:
a memory that stores a neural network based image generation model and a plurality of processor executable instructions;
a data interface that receives a subject image containing a subject, a text description of the subject in the subject image, and a text prompt relating to a different rendition of the subject; and
one or more hardware processors that read and execute the plurality of processor-executable instructions from the memory to perform operations comprising:
encoding, via an image encoder of the subject-driven image generation framework, the subject image into an image feature vector;
encoding, via a first text encoder of the subject-driven image generation framework the text description into a text feature vector;
generating, by a multimodal encoder separated from but connected to both the image encoder and the first text encoder, a vector representation of the subject based on the image feature vector from the image encoder and the text feature vector from the text encoder;
generating, by a second text encoder of the subject-driven image generation framework, an image generation prompt based on the vector representation of the subject and the text prompt; and
generating, by a neural network based image generation model, an output image containing the subject rendered according to the text prompt based on an input image generation prompt combining the text prompt and the vector representation.

9. The system of claim 8, the operations further comprising:
training jointly the multimodal encoder, the text encoder, and the neural network based image generation model based on a comparison of the output image and a modified image containing the subject on a different background than a background in the subject image.

10. The system of claim 9,
wherein the generating the vector representation is further based on a plurality of query vectors, and
wherein the training includes updating the plurality of query vectors.

11. The system of claim 8, the operations further comprising:
training the neural network based image generation model based on a comparison of the output image and the subject image.

12. The system of claim 11, the operations further comprising:
keeping parameters of the text encoder frozen while training the neural network based image generation model.

13. The system of claim 8, the operations further comprising:
generating, by the multimodal encoder, a plurality of vector representations of the subject based on a plurality of image feature vectors,
wherein the vector representation is an average of the plurality of vector representations.

14. The system of claim 8, the operations further comprising:
receiving, via the data interface, a conditioning image,
wherein the generating the output image is further based on the conditioning image.

15. A non-transitory machine-readable medium comprising a plurality of machine-executable instructions for a subject-driven image generation framework which, when executed by one or more processors, are adapted to cause the one or more processors to perform operations comprising:
receiving, via a data interface, a subject image containing a subject, a text description of the subject in the subject image, and a text prompt relating to a different rendition of the subject;
encoding, via an image encoder of the subject-driven image generation framework, the subject image into an image feature vector;
encoding, via a first text encoder of the subject-driven image generation framework the text description into a text feature vector;
generating, by a multimodal encoder separated from but connected to both the image encoder and the first text encoder, a vector representation of the subject based on the image feature vector from the image encoder and the text feature vector from the text encoder;
generating, by a second text encoder of the subject-driven image generation framework, an image generation prompt based on the vector representation of the subject and the text prompt; and
generating, by a neural network based image generation model, an output image containing the subject rendered according to the text prompt based on image generation prompt combining the text prompt and the vector representation.

16. The non-transitory machine-readable medium of claim 15, the operations further comprising:
training jointly the multimodal encoder, the text encoder, and the neural network based image generation model based on a comparison of the output image and a modified image containing the subject on a different background than a background in the subject image.

17. The non-transitory machine-readable medium of claim 16,
wherein the generating the vector representation is further based on a plurality of query vectors, and
wherein the training includes updating the plurality of query vectors.

18. The non-transitory machine-readable medium of claim 15, the operations further comprising:
training the neural network based image generation model based on a comparison of the output image and the subject image.

19. The non-transitory machine-readable medium of claim 18, the operations further comprising:
keeping parameters of the text encoder frozen while training the neural network based image generation model.

20. The non-transitory machine-readable medium of claim 15, the operations further comprising:
generating, by the multimodal encoder, a plurality of vector representations of the subject based on a plurality of image feature vectors,
wherein the vector representation is an average of the plurality of vector representations.

* * * * *